US012746837B2

(12) United States Patent
Garcia-Ferre et al.

(10) Patent No.: US 12,746,837 B2
(45) Date of Patent: Sep. 29, 2026

(54) CHARGING CONNECTOR FOR AN ELECTRIC VEHICLE

(71) Applicant: ABB E-mobility B.V., Delft (NL)

(72) Inventors: Francisco Garcia-Ferre, Baden (CH); Lilian Kaufmann, Birmenstorf (CH); Pedram Kheiri, Hausen (CH); Stefan Raaijmakers, Delft (NL); Wiebe Zoon, Delft (NL)

(73) Assignee: ABB E-MOBILITY B.V., Delft (NL)

( * ) Notice: Subject to any disclaimer, the term of this patent is extended or adjusted under 35 U.S.C. 154(b) by 299 days.

(21) Appl. No.: 18/394,131

(22) Filed: Dec. 22, 2023

(65) Prior Publication Data

US 2024/0123850 A1 Apr. 18, 2024

Related U.S. Application Data

(63) Continuation of application No. PCT/EP2022/067330, filed on Jun. 24, 2022.

(30) Foreign Application Priority Data

Jun. 30, 2021 (EP) .................................... 21182768

(51) Int. Cl.
*B60L 53/302* (2019.01)
*B60L 53/16* (2019.01)
(Continued)

(52) U.S. Cl.
CPC ............. *B60L 53/302* (2019.02); *B60L 53/16* (2019.02); *B60L 53/18* (2019.02); *H01B 7/425* (2013.01)

(58) Field of Classification Search
CPC ........ B60L 53/302; B60L 53/16; B60L 53/18; B60L 53/11; H01B 7/425; Y02T 10/70;
(Continued)

(56) References Cited

U.S. PATENT DOCUMENTS

| | | | |
|---|---|---|---|
| 10,029,575 | B2 | 7/2018 | Remisch |
| 10,081,262 | B2 | 9/2018 | Nagel et al. |

(Continued)

FOREIGN PATENT DOCUMENTS

| | | | |
|---|---|---|---|
| CN | 106347166 | A | 1/2017 |
| CN | 109075478 | A | 12/2018 |

(Continued)

OTHER PUBLICATIONS

European Patent Office, International Search Report in International Patent Application No. PCT/EP2022/067330, 4 pp. (Sep. 2, 2022).

(Continued)

*Primary Examiner* — Abdullah A Riyami
*Assistant Examiner* — Nader J Alhawamdeh
(74) *Attorney, Agent, or Firm* — McCarter & English, LLP; Michael M. Gnibus

(57) ABSTRACT

An electric vehicle charging connector includes contact elements that are electrically connected to a cable. The contact elements comprise a block portion and at least one contact finger extending from the block portion, and a cooling tube for forced cooling that includes a liquid coolant for cooling at least one of the contact elements. The cooling tube is fluidly connected to an internal cooling channel of the contact element. The cooling channel extends from the block portion into the contact finger so that both parts are cooled by the cooling fluid.

9 Claims, 2 Drawing Sheets

(51) Int. Cl.
*B60L 53/18* (2019.01)
*H01B 7/42* (2006.01)

(58) Field of Classification Search
CPC ....... Y02T 10/7072; Y02T 90/14; H02G 3/03; H01R 13/005; H01R 2201/26
See application file for complete search history.

(56) References Cited

U.S. PATENT DOCUMENTS

| | | | |
|---|---|---|---|
| 10,109,395 B2 | 10/2018 | Beimdieck et al. | |
| 10,449,871 B1 * | 10/2019 | Lyon | B60L 53/14 |
| 12,470,009 B2 * | 11/2025 | Garcia-Ferre | H01R 13/502 |
| 2018/0264957 A1 | 9/2018 | Fuehrer et al. | |
| 2019/0074628 A1 | 3/2019 | Fuehrer | |
| 2019/0291588 A1 * | 9/2019 | Chou | H01R 13/5202 |
| 2019/0315239 A1 | 10/2019 | Beimdieck et al. | |
| 2020/0234853 A1 | 7/2020 | Lee et al. | |
| 2023/0158904 A1 * | 5/2023 | Garcia-Ferre | H02J 7/0042 320/109 |
| 2023/0182592 A1 * | 6/2023 | Garcia-Ferre | B60L 53/16 439/296 |
| 2023/0241991 A1 * | 8/2023 | Kaufmann | B60L 53/302 439/485 |
| 2024/0123850 A1 * | 4/2024 | Garcia-Ferre | B60L 53/16 |

FOREIGN PATENT DOCUMENTS

| | | | | |
|---|---|---|---|---|
| CN | 211126154 U | 7/2020 | | |
| DE | 102011100389 A1 | 5/2012 | | |
| DE | 102016105347 A1 | * | 9/2017 | B60L 53/16 |
| DE | 102016206300 A1 | | 10/2017 | |
| DE | 102016117011 A1 | | 3/2018 | |
| DE | 102016206300 B4 | | 2/2020 | |
| DE | 102019214024 A1 | * | 3/2021 | H05K 7/20272 |
| JP | 2012-238532 A | | 12/2012 | |
| WO | WO 2017/133893 A1 | | 8/2017 | |
| WO | WO-2017143295 A1 | * | 8/2017 | B60L 53/18 |
| WO | WO 2017/162464 A1 | | 9/2017 | |
| WO | WO 2017/162494 A1 | | 9/2017 | |
| WO | WO 2017/162651 A1 | | 9/2017 | |
| WO | WO 2017/163532 A1 | | 9/2017 | |
| WO | 2017/178321 A1 | | 10/2017 | |
| WO | WO 2018/006903 A1 | | 1/2018 | |
| WO | WO 2018/050724 A1 | | 3/2018 | |
| WO | WO 2018/060151 A1 | | 4/2018 | |
| WO | WO 2018/192805 A1 | | 10/2018 | |
| WO | WO 2019/008047 A1 | | 1/2019 | |

OTHER PUBLICATIONS

European Patent Office, Written Opinion in International Patent Application No. PCT/EP2022/067330, 7 pp. (Sep. 2, 2022).

European Patent Office, Extended European Search Report in European Patent Application No. 21182768.8, 8 pp. (Nov. 24, 2021).

Chinese Office Action for Application No. 202280044801.0, dated Mar. 3, 2026, 18 pages.

* cited by examiner

CHARGING CONNECTOR FOR AN ELECTRIC VEHICLE

CROSS-REFERENCE TO RELATED APPLICATIONS

The instant application claims priority to International Patent Application No. PCT/EP2022/067330, filed Jun. 24, 2022, and to European Patent Application No. 21182768.8, filed Jun. 30, 2021, each of which is incorporated herein in its entirety by reference.

FIELD OF THE DISCLOSURE

The present disclosure relates to an electric vehicle charging connector for an electric vehicle and a charging station.

BACKGROUND OF THE INVENTION

One limiting factor in charging cables for electric vehicles is the heat that is generated when high currents flow through the cable and the electrical connector from the charging station to the battery of a vehicle. The heat may be actively conducted away from the heat sources using liquids. In this way current rates over 500 A are achieved. For this kind of cooling arrangements are required that comprise and conduct the liquid from heat sources to the heat sinks and back. Additional devices such as pumps are necessary. Alternatively, passive cooling is possible. However, with existing designs only current ratings up to 200 A are achievable. Passive cooling needs a design as hollows in the enclosure or material of the enclosure for not insulating the heat in the enclosure. Such designs may not be effective or lead to a high weight of the charging cable.

Prior art US 2019/0315239 A1 discloses an electrical contact element for a car charging plug connector. The electrical contact element has a contact part and a connection part, wherein the connection part can be connected to an electrical conductor of a cable. Cooling liquid can be delivered to the contact element. As a result, the heat produced on the contact element is extracted directly.

U.S. Pat. No. 10,109,395 B2 relates to a connection unit for a fluid-cooled cable and to a system composed of a plug-in connector, a fluid-cooled cable and a connection unit. The connection unit comprising a housing, which has a cable connecting opening, a fluid inlet opening and a fluid outlet opening.

US 2019/0074628 A1 relates to a plug-in connector part for plug-in connection to a mating plug-in connector part.

Prior art DE 10 2011 100 389 A1 discloses a charging cable for transferring electrical energy to an energy storage device of an electric or hybrid vehicle. The charging cable comprises a coolant-guiding device, which is arranged inside a cable jacket.

BRIEF SUMMARY OF THE INVENTION

The present disclosure describes an improved charging connector having electric contacts, with which high current rates are possible. In one embodiment, an electric vehicle charging connector is described, comprising contact elements. The contact elements are electrically connected to a cable. The contact elements comprise a block portion and at least one contact finger extending from the block portion. The electric charging connector further comprises a cooling tube for forced cooling, comprising a liquid coolant for cooling at least the contact element.

The cooling tube is fluidly connected to an internal cooling channel of the contact element, wherein the cooling channel is extending from the block portion into the contact finger, so that both parts are cooled by the cooling fluid.

The charging connector provides the charging current from a charging station to the battery of an electric vehicle. Thus, "charging connector" is understood to be a handheld device such as a charging gun or charging nozzle. The counterpart of the charging connector on vehicle-side is called socket. The contacts elements are preferably provided in an inner casing surrounded by an outer casing. Between the outer casing and the inner casing, there may be free space or air such that the weight of the connector is reduced, thereby providing a convenient handling and shape of the connector. The contact elements are elements, which are electrically conductive and which are electrically connected to socket contacts charging the electric vehicle.

A block portion according to the invention is a part, which has a significant higher volume compared to the contact finger. The block portion thereby is designed to be electrically connected with the cable. Further, the block portion is designed to be additionally connected with the cooling tube and to provide the contact fingers. Preferably, the block portion has a cuboid shape. For providing an electrical connection between charging station and the vehicle, the contact finger comes into contact with a mating contact of the vehicle socket. The contact finger thereby is introduced into a female socket. In order to avoid a human finger entering the socket, a thickness of the contact finger is smaller than a human finger. For increasing the contact area, preferably at least two contact fingers are provided.

A cooling tube according to the disclosure is a pipe in which a cooling fluid is transported. By providing the block portion with cooling channels, the block portion can be efficiently cooled. Due to the small thickness of these fingers, resulting in a higher heat loss density, this part is hotter than the block portion. As these pipes further extends into the fingers, also the fingers can be efficiently cooled. Preferably, the pipe extends to a front end of the fingers. Thus, the contact fingers are not merely cooled via heat conduction, which is less efficient than cooling the fingers via the cooling fluid in the cooling channels. Accordingly, it is possible operating the contact element with higher voltage and current, without exceeding an allowable temperature range of the contact element. Thereby, it is possible to reduce the charging time for a heavy load vehicle.

In a preferred embodiment, an exit of the cooling channel of the block portion is connected to a cable jacket of the cables, so that the cooling fluid cools the cables at the return flow. The cooling fluid thereby flows between the cable jacket and the cable. Thereby it is also possible to cool the cables, so that the diameter of the cables can be reduced compared to non-cooled cables. Further, an additional cooling tube for the return flow can be omitted. From this it follows, that also the space required for the cables can be reduced, compared to non-cooled cables and an additional cooling tube.

In a further preferred embodiment, the cooling channels in the block portion provide a communication channel, with which the cooling fluid partly bypasses the cooling channel of the contact finger. A communication channel thereby is a channel, which directly connects an entry region with an exit region in the block portion. By doing so, the cooling medium does not flow through the cooling channel of the contact fingers. With such a communication channel, it is possible to optimize the pressure drop in the contact element. As not all the cooling fluid enters the contact finger, the cooling fluid entering the cable jacket has a lower temperature. Accordingly, the cooling effect on the cables can be increased.

Advantageously, the communication channel has a smaller cross section than the cooling channel of the block portion and/or the contact finger. By adapting the cross section of the communication channel, it is possible to regulate the cooling fluid flowing into the contact finger during the design phase of the contact element. Thereby, it is possible to provide an optimal cooling for the contact finger and the cables, so that the efficiency of the cooling system is improved.

In a further embodiment, the contact element is a 3D-printing part. A 3D-printing part thereby is a part, which is manufactured via a 3D-printing process. In a 3D-printing process, the part is manufactured by printing each layer on top of the previous layer. Thereby, complex parts can be manufactured, which are difficult to machine with common methods. In particular, this method facilitates to provide cooling channels in the contact fingers. It is also possible to provide cooling channel designs, which cannot be manufactured with common methods.

In various embodiments, the cooling channels can have a circular-, a drop-like-, a diamond- or ellipse-shaped cross-section. The drop-like-shape and the diamond-shape have the advantage that in contrast to the circular-shape it is possible to print the cooling channel during the 3D-printing process without using a support structure for the cooling channel. The 3D-printing process therefore can be simplified and time for manufacturing the contact element can be reduced. Further, the material for the support structure can be saved, so that these cross sections can be economically manufactured. In contrast thereto, it is easier to manufacture a circular design during common manufacturing processes. An ellipse-shaped cross-section has the advantage, if the small ellipse axis is arranged with the thickness of the contact finger, a high cross section area for the cooling channel could be provided. Accordingly, pressure drop in the contact finger can be decreased, so that the efficiency of the cooling system can be improved.

Alternatively, the contact element comprises at least two pieces, which are joint together by brazing or welding. By providing two pieces, the cooling channels can be manufactures via an e.g. CNC manufacturing method. This also enables producing the cooling channels in the contact fingers. After, both parts are manufactured they are joint via brazing or welding.

In one embodiment, the cooling channel in the finger has a meander or spiral design. With such a design, a large area of the contact finger can be cooled via the cooling fluid. Accordingly, a high cooling effect can be achieved.

Preferably, the contact finger has a flat design. A flat design thereby is characterized in that a thickness of the contact finger is much smaller than the width and length. By providing a flat design a high surface area can be provided, so that the heat dissipation is improved further it can be ensured that a human finger cannot enter a socket for the contact finger. Accordingly, a high power transmission with a high human safety can be provided.

According to a further aspect, a charging station is provided, comprising an electric vehicle charging connector as described above. The described electric vehicle charging connector may therefore be a part of a charging station. With such a charging station, the aforementioned advantages are achieved.

These and other features, aspects and advantages of the present invention will become better understood with reference to the accompanying figure and the following description. Identical or equivalent elements are in principle provided with the same reference signs.

BRIEF DESCRIPTION OF THE SEVERAL VIEWS OF THE DRAWING(S)

Figure 3A:
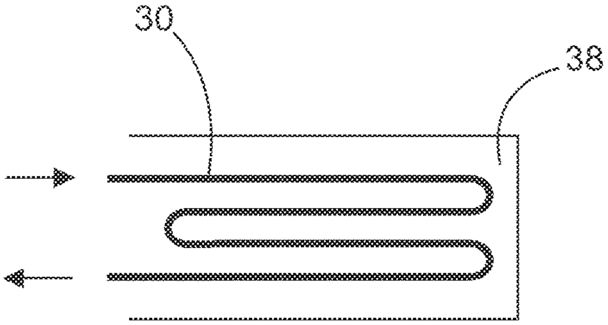

FIG. 3*a* is a diagrammatic view of a cooling channel design of the contact finger according to an embodiment of the present disclosure.

Figure 3B:
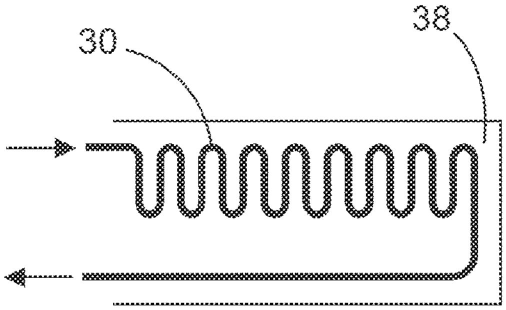

FIG. 3*b* is a diagrammatic view of a cooling channel design of the contact finger according to a further embodiment of the present disclosure.

FIGS. 4*a*, 4*b*, 4*c*, and 4*d* are alternative embodiments of a cooling channel cross section in accordance with the disclosure.

DETAILED DESCRIPTION OF THE INVENTION

Figure 1:
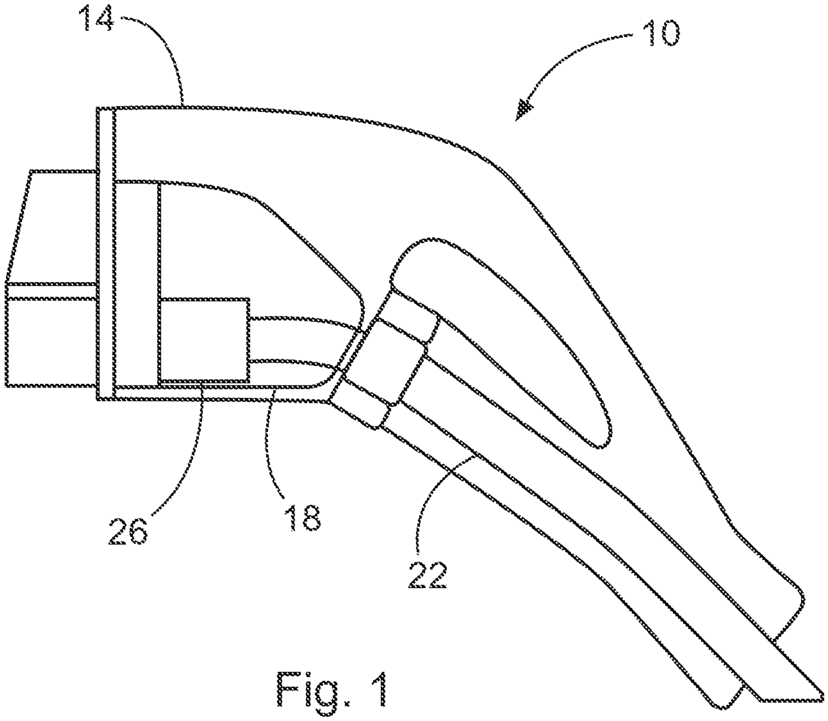
FIG. 1 is an outline view from a side perspective of an electric vehicle charging connector in accordance with the disclosure.

FIG. 1 shows an electric vehicle charging connector 10, according to an embodiment of the present disclosure. The electric vehicle charging connector 10 may comprise essentially an outer casing or enclosure 14, respectively, an inner casing or enclosure 18, respectively, a cable 22 for conducting charge current from a charge station (not shown) to a battery charge socket. The cable 22 is linked to a contact element 26 inside the inner enclosure 18. At an opposite end to the cable 22, the contact element 26 comes in contact with a respective socket of a vehicle. The function of the inner enclosure 18 is to ensure electrical insulation, to provide mechanical strength, and to prevent the electric vehicle charging connector 10 from contamination by intruding water and dirt. For this reason, the inner enclosure 18 is massively sealed, and in some designs exhibits also a nearly completely potted structure. This structure is further enclosed in the outer enclosure 14. The purpose of the structure is to provide a handle for a user and other functions that interact with the user. One of the reasons for separating enclosure 14 and 18 is weight reduction.

Figure 2:
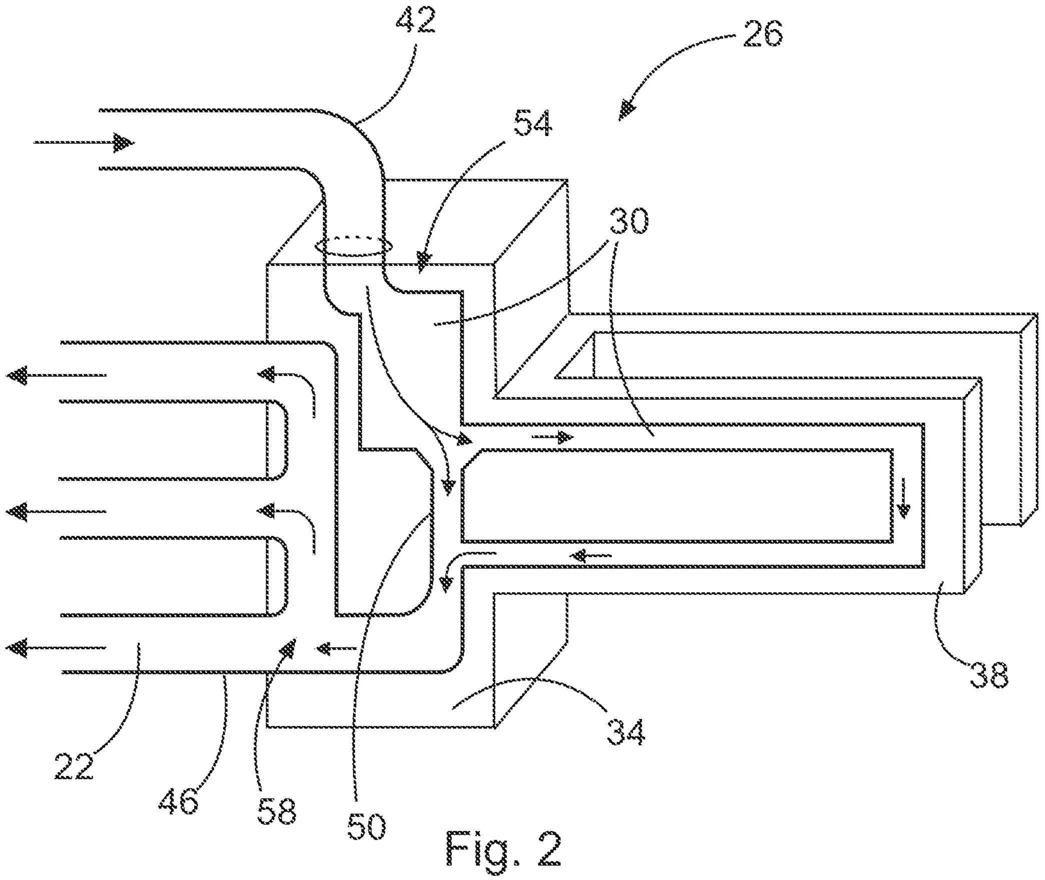
FIG. 2 is a diagram of a contact element with a cooling channel in accordance with the disclosure.

FIG. 2 shows the contact element 26 with a cooling channel 30 according to an embodiment of the invention. The contact element 26, which is made of an e.g. copper material, comprises a block portion 34 and flat contact fingers 38, extending from the block portion 34. For providing the cooling channel 30 in the contact element 26, either this part can be manufactured via 3D printing or by welding respectively brazing two halves of contact element parts 26 together. In this embodiment, the contact element 26 provides two contact fingers 38, which are parallel and spaced apart to each other. The contact fingers 38 provide the electric contact with a mating contact of a vehicle socket (not shown). The electric vehicle charging connector 10 further comprises a cooling tube 42 that is fluidly connected to the block portion 34 of the contact element 26. The cooling fluid of the cooling tube 42 thereby can enter into the cooling channel 30 of the block portion 34. The cooling channels 30 of the block portion are connected with cooling channels 30 of the contact fingers 38, which extends to the tip of the fingers 38. In this example, the cooling channel 30 of the contact finger 38 has a U-shape.

With the cooling fluid, the block portion 34 and the contact finger 38 can be cooled. At an exit of the cooling channels 30, they are split up into three branches entering in a cable jacket 46 of the cables 22. Thereby, the cables 22 are additionally cooled. In this embodiment, a communication channel 50 is provided in the block portion 34, connecting the cooling channel 30 in the entry region 54 with the cooling channel 50 at an exit region 58. Thereby, the cooling channel 30 of the contact finger 38 can be partly bypassed. In an embodiment not shown, the contact element 26 also could be provided without the communication channel 54. Thereby, the whole cooling fluid is forced to circulate through the contact finger 38. In order to circulate and cool the cooling fluid, the charge station (not shown) provides a fluid pump and a device for cooling the cooling fluid.

FIG. 3*a* shows a cooling channel design of the contact finger 38 according to an embodiment. In this embodiment, the cooling channel 30 in the contact finger 38 form several loops in a longitudinal direction of the contact finger 38. Thereby a large area of the contact finger 38 can be cooled, so that the heat of the contact finger 38 efficiently can be removed. A further embodiment of a cooling channel design of the contact finger 38 is shown in FIG. 3*b*, where the cooling channel 30 in the finger 38 form several loop in a transverse direction of the contact finger 38. Also with this design, a high cooling effect can be achieved.

Figure 4A:
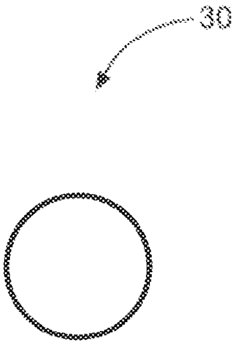
Figure 4B:
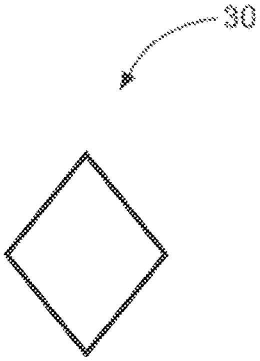
Figure 4C:
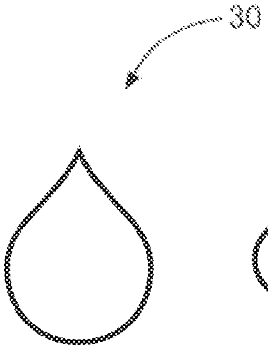
Figure 4D:
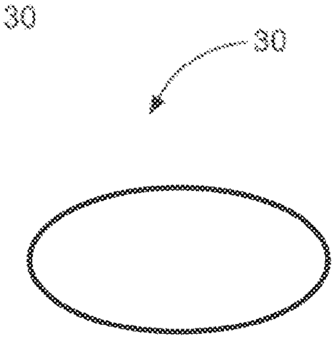

FIGS. 4*a-d* show different embodiments of a cooling channel 30 cross section. A first embodiment (FIG. 4*a*) shows a circular design of the cooling channel 30. In a second embodiment (FIG. 4*b*), the cross section has a diamond-shaped cross section. This design has the advantage that if the contact element 26 is manufactured by a 3D printing process, no printing support structure in the cooling channel 30 is required. FIG. 4*c* shows a teardrop cross section. The same would be true for the ellipse design (FIG. 4*d*), if the cooling channel 30 is printed along the longitudinal axis of the ellipse. The ellipse design further has the advantage that due to a smaller height in one axis of the ellipse, this cooling channel can also be provided in flat parts like the contact fingers 38.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE NUMBERS

10 electric vehicle charging connector
14 outer enclosure
18 inner enclosure
22 cable
26 contact element
30 cooling channel
34 block portion
38 contact finger
42 cooling tube
46 cable jacket
50 communication channel
54 entry region
58 exit region

What is claimed is:

1. Electric vehicle charging connector, comprising:
contact elements that are electrically connected to a cable, wherein the contact elements comprise a block portion and at least one contact finger extending from the block portion, the at least one contact finger for providing electric contact with a mating contact of a vehicle;
a cooling tube for forced cooling, the cooling tube comprising a liquid coolant is configured for cooling at least the contact elements;
wherein the cooling tube is fluidly connected to an internal cooling channel of each of the contact elements;
wherein the cooling channel extends from the block portion into the contact finger so that both parts are cooled by the cooling fluid.

2. The electric vehicle charging connector according to claim 1, wherein an exit of the cooling channel of the block portion is connected to a cable jacket of the cables so that the cooling fluid cools the cables at a return flow.

3. The electric vehicle charging connector according to claim 1, wherein the cooling channels in the block portion provide a communication channel with which the cooling fluid partly bypasses the cooling channel of the contact finger.

4. The electric vehicle charging connector according to claim 3, wherein the communication channel has a smaller cross section than the cooling channel of the block portion and/or the contact finger.

5. The electric vehicle charging connector according to claim 1, wherein the cooling channels have one of a circular-, a teardrop-, a diamond-, a square- or an ellipse-shaped cross-section.

6. The electric vehicle charging connector according to claim 1, wherein the contact element is a single 3D-printing part.

7. The electric vehicle charging connector according to claim 1, wherein the contact element comprises at least two pieces that are joined together by brazing or welding.

8. The electric vehicle charging connector according to claim 1, wherein the cooling channel in the finger has a meander or spiral design.

9. The electric vehicle charging connector according to claim 1, wherein contact finger has a flat shape.

* * * * *